(12) United States Patent
Hsieh et al.

(10) Patent No.: US 9,260,593 B2
(45) Date of Patent: Feb. 16, 2016

(54) CONJUGATED DIENE RUBBER MODIFIED WITH POLAR ALKOXYSILANE, METHOD AND COMPOSITION THEREOF

(75) Inventors: Chi-Chen Hsieh, Kaohsiung (TW); Fu Lin, Kaohsiung (TW); Chi-Ta Tsai, Kaohsiung (TW); Hui-Kai Lin, Taichung (TW); Bo-Han Lin, Taichung (TW)

(73) Assignee: TSRC Corporation, Taipei (TW)

( * ) Notice: Subject to any disclaimer, the term of this patent is extended or adjusted under 35 U.S.C. 154(b) by 678 days.

(21) Appl. No.: 13/607,450

(22) Filed: Sep. 7, 2012

(65) Prior Publication Data

US 2013/0150522 A1 Jun. 13, 2013

Related U.S. Application Data

(60) Provisional application No. 61/569,881, filed on Dec. 13, 2011.

(30) Foreign Application Priority Data

Jun. 5, 2012 (TW) .............................. 101120085 A

(51) Int. Cl.
| | | |
|---|---|---|
| C08C 19/22 | (2006.01) | |
| C08L 19/00 | (2006.01) | |
| C08F 4/56 | (2006.01) | |
| C08F 36/06 | (2006.01) | |
| C08F 36/08 | (2006.01) | |
| C08F 8/30 | (2006.01) | |
| C08C 19/25 | (2006.01) | |
| C08C 19/44 | (2006.01) | |
| C08F 36/04 | (2006.01) | |

(52) U.S. Cl.
CPC ............. *C08L 19/006* (2013.01); *C08C 19/22* (2013.01); *C08C 19/25* (2013.01); *C08C 19/44* (2013.01); *C08F 4/56* (2013.01); *C08F 8/30* (2013.01); *C08F 36/04* (2013.01); *C08F 36/06* (2013.01); *C08F 36/08* (2013.01)

(58) Field of Classification Search
CPC .......... C08L 19/006; C08F 4/56; C08F 36/06; C08F 36/08; C08F 8/30; C08F 36/04; C08C 19/22; C08C 19/25; C08C 19/44
See application file for complete search history.

(56) References Cited

U.S. PATENT DOCUMENTS 5,066,721 A 11/1991 Hamada et al.
2005/0020757 A1 1/2005 Ozawa et al.
2008/0146745 A1 6/2008 Luo et al.
2008/0171827 A1* 7/2008 Hogan et al. ................. 524/570
2010/0130664 A1 5/2010 Rachita et al.

FOREIGN PATENT DOCUMENTS

| EP | 1939220 A2 | 7/2008 |
| KR | 10-2008-0063181 A | 7/2008 |
| WO | 2011028523 A2 | 3/2011 |
| WO | 2012078962 A1 | 6/2012 |

OTHER PUBLICATIONS

European Search Report mailed Jun. 24, 2009 in counterpart European Publication No. 1939220.
International Search Report mailed Mar. 10, 2011 in counterpart International Publication No. 2011/028523.
European Search Report mailed Dec. 20, 2013 in counterpart European Application No. 12187927.4.
Taiwanese Search Report mailed Jan. 20, 2014 in counterpart Taiwanese Application No. 101120085.
Korean Office Action mailed Feb. 12, 2014 in counterpart Korean Application No. 10-2012-0131849.

\* cited by examiner

*Primary Examiner* — Peter D Mulcahy
(74) *Attorney, Agent, or Firm* — Snell & Wilmer L.L.P.

(57) ABSTRACT

A modified conjugated diene rubber is disclosed. A method for producing the modified conjugated diene rubber includes providing an alkali metal ion-containing conjugated diene rubber; and reacting the alkali metal ion-containing conjugated diene rubber with an alkoxysilane to generate the modified conjugated diene rubber, the alkoxysilane being of the structural formula:

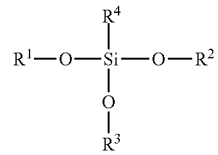

wherein $R^1$, $R^2$, $R^3$ are each independently selected from a group consisting of oxygen-containing $C_2$-$C_{12}$ group and nitrogen-containing $C_3$-$C_{12}$ group, the oxygen-containing $C_2$-$C_{12}$ group has a carbon atom directly connected to oxygen atom of the alkoxysilane, the nitrogen-containing $C_1$-$C_{12}$ group has a nitrogen atom directly connected to oxygen atom of the alkoxysilane, and $R^4$ is selected from a group consisting of $C_3$-$C_{12}$ of alkyl, alkenyl, aryl, and alkoxy.

28 Claims, No Drawings

CONJUGATED DIENE RUBBER MODIFIED WITH POLAR ALKOXYSILANE, METHOD AND COMPOSITION THEREOF

CROSS REFERENCE TO RELATED APPLICATION

This application claims the right of priority based on U.S. Provisional Application No. 61/569,881 entitled "CONJUGATED DIENE RUBBER MODIFIED WITH POLAR ALKOXYSILYL COMPOUND, METHOD AND COMPOSITION THEREOF," filed on Dec. 13, 2011; and Taiwan Patent Application No. 101120085 entitled "CONJUGATED DIENE RUBBER MODIFIED WITH POLAR ALKOXYSILANE, METHOD AND COMPOSITION THEREOF," filed on Jun. 5, 2012, which are incorporated herein by reference and assigned to the assignee herein.

FIELD OF INVENTION

The present invention relates to a conjugated diene rubber, and more particularly, to a conjugated diene rubber modified with alkoxysilane.

BACKGROUND OF THE INVENTION

Solution styrene butadiene rubbers (SSBR) are synthetic products consisting of butadiene and styrene units made by a solution polymerization method. Industrial production of the solution SBR was first proposed by the U.S. company, Phillips, in batch process and Firestone company in continuous process. Since the solution SBR is superior to the emulsion SBR in mechanical properties, rolling resistance, wet or ice skid resistance, the solution SBR is widely used by the automotive industry and in other rubber products.

With the increasingly requirements for cars with low fuel economy, demands on tire rubber materials for such characteristic requirements are also increased. Conjugated diene-based rubbers with low rolling resistance, excellent wear resistance, and balanced wet-skid resistance led to increasing demand by the automobile industry. On the other hand, the industry has proposed to add silica compounds or mixture of silica compounds and carbon black as a reinforcing agent to a rubber composition. Tire treads containing compounds with mixture of silica and carbon black or silica compounds are favorable with low rolling resistance and wet-skid resistance.

In order to achieve a better bond between the conjugated diene rubber and the reinforcing agent, the industry has developed lots of techniques for modified conjugated diene rubber. Of the related technical publications, U.S. Pat. No. 4,185,042 discloses a coupling agent used for SBS block copolymer. Lithium-containing polymer reacts with the silicon-containing coupling agent, thereby obtaining the SBS block copolymer with the coupling ratio>90% and without Si—OR group presented in the SBS block copolymer. U.S. Pat. No. 5,219,938 discloses a two-stage modification process. By using two kinds of modifiers, the chain ends containing lithium of diene polymer molecules react with coupling agents $R_nSiCl_{4-n}$ or $R_nSnCl_{4-n}$ to perform a first modification, and then with the coupling agent $(R_5R^6R^7—Si—(CH_2)_n—N—R^8R^9)$ to perform a second modification. U.S. Pat. No. 7,288,594 discloses a two-step modification of lithium-containing styrene-butadiene rubber by using two different kinds of silane compounds. In addition, U.S. Pat. No. 7,807,747 discloses a two-step modification of lithium-containing styrene-butadiene rubber by using the same silane compound.

However, the processes of the above-mentioned related arts are mostly complicated and difficult to practice. Therefore, there is a need of a novel modification technique for conjugated diene rubber to overcome the problems of conventional arts.

SUMMARY OF THE INVENTION

An object of the present invention is to provide a method for producing a conjugated diene rubber modified with alkoxysilane, a modified conjugated diene rubber made by the method, and a composition of the modified conjugated diene rubber.

According to one embodiment, the present invention provides a method for producing a modified conjugated diene rubber. The method includes (a) providing an alkali metal ion-containing conjugated diene rubber; and (b) reacting the alkali metal ion-containing conjugated diene rubber with an alkoxysilane to generate the modified conjugated diene rubber, the alkoxysilane being of the structural formula:

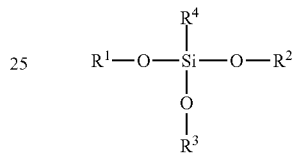

wherein $R^1$, $R^2$, $R^3$ are each independently selected from a group consisting of oxygen-containing $C_2$-$C_{12}$ group and nitrogen-containing $C_1$-$C_{12}$ group. The oxygen-containing $C_2$-$C_{12}$ group has a carbon atom directly connected to oxygen atom of the alkoxysilane and is preferably an ether group having a structure of general formula: —$C_mH_{2m}$—O—$C_nH_{2n+1}$, wherein each of m and n is a positive integer and m+n=2~12. The nitrogen-containing $C_1$-$C_{12}$ group has a nitrogen atom directly connected to oxygen atom of the alkoxysilane and is preferably an imine group having a structure of general formula: $(C_nH_{2n+1})(C_mH_{2m+1})C=N—$, wherein m is an integer of 0 to 10; n is an integer of 1 to 11. $R^4$ is selected from a group consisting of $C_3$-$C_{12}$ of alkyl, alkenyl, aryl, and alkoxy.

According to one embodiment, the present invention provides a modified conjugated diene rubber, which is represented by the following structural formula:

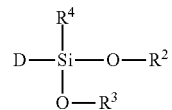

wherein:
D is a polymer of conjugated diene monomer or a copolymer of conjugated diene monomer and vinyl aromatic hydrocarbon monomer; $R^2$, $R^3$ are each independently selected from a group consisting of oxygen-containing $C_2$-$C_{12}$ group and nitrogen-containing $C_1$-$C_{12}$ group. The oxygen-containing $C_2$-$C_{12}$ group has a carbon atom directly connected to oxygen atom of the alkoxysilane and is preferably an ether group having a structure of general formula: —$C_mH_{2m}$—O—$C_nH_{2n+1}$, wherein each of m and n is a positive integer and m+n=2~12. The nitrogen-containing $C_1$-$C_{12}$ group has a nitrogen atom directly connected to oxygen atom of the alkoxysilane and is preferably an imine group having a structure of general formula: $(C_nH_{2m+1})(C_mH_{2m+1})C=N-$, wherein m is an integer of 0 to 10; n is an integer of 1 to 11. $R^4$ is selected from a group consisting of $C_1$-$C_{12}$ of alkyl, alkenyl, aryl, and alkoxy.

Other aspects and various embodiments included in the present invention to solve other problems and combined with the above aspects are disclosed in the following detailed description.

DETAILED DESCRIPTION OF THE INVENTION

The preferred embodiments of the present invention will now be described in greater detail. Descriptions of well-known components, materials, and process techniques are omitted so as to not unnecessarily obscure the embodiments of the invention. The present invention is described with reference to the illustrative embodiments; these descriptions should not be construed in a limiting sense. Various modifications of the illustrative embodiment, as well as other embodiments of the invention, will be apparent upon reference to these descriptions. It is therefore contemplated that the appended claims will cover any such modifications or embodiments as falling within the true scope of the invention and its legal equivalents.

Polymerization: Formation of Alkali Metal Ion-Containing Conjugated Diene Rubber In the present invention, the method for producing the alkali metal ion-containing conjugated diene rubber includes polymerizing conjugated diene monomers or conjugated diene monomers and vinyl aromatic hydrocarbon monomers in a suitable solvent by anionic polymerization using an organic alkali metal compound as the initiator to obtain the alkali metal ion-containing conjugated diene rubber.

The polymers used in the present invention can be polymers of conjugated diene monomers, or copolymers of conjugated diene monomers (e.g., butadiene or isoprene) and vinyl aromatic hydrocarbon monomers (e.g., styrene or methyl styrene). The monomers used in the present invention are not limited to butadiene, isoprene, and styrene; other suitable derivatives are also applicable in the present invention. For example, the conjugated diene monomer can be independently selected from the group consisting essentially of: 1,3-butadiene, 2,3-dimethyl-1,3-butadiene, 3-butyl-1,3-octadiene, isoprene, 1-methylbutadiene, 2-phenyl-1,3-butadiene, and any combinations thereof. The vinyl aromatic hydrocarbon monomer can be independently selected from the group consisting essentially of: styrene, methylstyrene and all isomer thereof, ethylstyrene and all isomer thereof, cyclohexylstyrene, vinyl biphenyl, 1-vinyl-5-hexyl naphthalene, vinyl naphthalene, vinyl anthracene, and any combinations thereof.

During polymerization, the preferable option is to use organic lithium compounds as an initiator, thereby obtaining the alkali metal ion-containing conjugated diene rubber having activated carbon-lithium ion in the polymer chain end. The specific examples of organolithium initiators include n-propyl lithium, isopropyl lithium, n-butyl lithium, sec-butyl lithium, tert-butyl lithium, amyl lithium, phenyl lithium, tolyl lithium, and the like, wherein n-butyl lithium is preferred.

Solvents suitable for polymerization include inert organic solvents, wherein the inert solvents are not involved in the polymerization reaction. Examples of such inert solvents include aliphatic hydrocarbon compounds such as butane, isobutane, pentane, n-pentane, isopentane, 2,2,4-trimethyl pentane, iso-hexane, n-hexane, iso-heptane, n-heptane, iso-octane, and n-octane; or naphthenic family compounds, such as cyclohexane, methyl cyclohexane, ethyl cyclohexane, cyclopentane, cycloheptane, methyl cyclopentane; or aromatic compounds such as benzene, toluene, xylene, ethylbenzene, diethylbenzene and propylbenzene, wherein cyclohexane is preferred in the present invention. The polymer concentration of the conjugated diene rubber is generally in a range of 5 wt % to 35 wt %, preferably in a range of 10 wt % to 30 wt %. In general, if inert organic solvents are simply used as the polymerization medium, the polymerization rate of vinyl aromatic hydrocarbons or conjugated dienes is slow and the polymerization reactivity between the two is quite different. Such difference can be overcome by way of adding polar solvents. The specific examples of applicable polar solvents of the invention include ethers compounds such as tetrahydrofuran, diethyl ether, cyclopentyl ether, dipropyl ether, ethylene glycol dimethyl ether, ethylene glycol diethyl ether, diethylene glycol, dimethyl ether, and methyl ether, wherein tetrahydrofuran and diethyl ether are preferred in the present invention.

The initial polymerization temperature can be in a range of 10° C. to 80° C. The final polymerization temperature can be in a range of 30° C. to 150° C. The temperature control methods can include adiabatic reaction, constant temperature control, or partial cooling control.

The weight ratio of conjugated diene/vinyl aromatic hydrocarbon is in a range of 100/0 to 50/50, preferably in a range of 95/5 to 55/45, and more preferably in a range of 85/15 to 60/40.

The initial number-average molecular weight of the polymer after polymerization but before reaction with the modifier is in a range of 80 kg/mole to 2000 kg/mole, preferably in a range of 100 kg/mole to 1500 kg/mole, and more preferably in a range of 150 kg/mole to 1000 kg/mole. The measurement of number-average molecular weight can be performed by means of gel permeation chromatography (GPC), which is well-known in the art.

Modification: Reaction of Alkali Metal Ion-Containing Conjugated Diene Rubber with Alkoxysilane The modifier used in the modification process of the present invention is alkoxysilane, the alkoxysilane being of the structural formula:

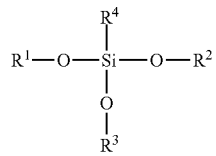

wherein $R^1$, $R^2$, $R^3$ are each independently selected from a group consisting of oxygen-containing $C_2$-$C_{12}$ group and nitrogen-containing $C_1$-$C_{12}$ group; the oxygen-containing $C_2$-$C_{12}$ group has a carbon atom directly connected to oxygen atom of the alkoxysilane; the nitrogen-containing $C_1$-$C_{12}$ group has a nitrogen atom directly connected to oxygen atom of the alkoxysilane; $R^4$ is selected from a group consisting of $C_1$-$C_{12}$ of alkyl, alkenyl, aryl, and alkoxy.

In each embodiment of the present invention, the oxygen-containing $C_2$-$C_{12}$ group of $R^1$, $R^2$, $R^3$ is preferably an ether group, wherein $R^1$, $R_2$, $R^3$ can be the same or different oxygen-containing group. The preferable example of the ether group can be represented by a structure of general formula: $-C_mH_{2m}-O-C_nH_{2n+1}$, wherein each of m and n is a positive integer and m+n=2~12. The preferable examples of the oxygen-containing $C_2$-$C_{12}$ group include, for example, $CH_3$—O—$CH_2$—, $CH_3$—O—$C_2H_4$—, $CH_3$—O—$C_3H_6$—, $CH_3$—O—$C_4H_8$— (methyl-n-butyl ether group or methyl tert-butyl ether group), $CH_3$—O—$C_6H_{12}$—, $C_2H_5$—O—$C_2H_4$— (diethyl ether group), $C_2H_5$—O—$CH_2$—, $C_2H_5$—O—$C_3H_6$—, $C_2H_5$—O—$C_4H_8$— (ethyl-n-butyl ether group or ethyl tert-butyl ether group), $CH_3$—O—$C_4H_8$—CH($C_2H_5$)—$CH_2$—, $C_2H_5$—O—$C_4H_8$—CH($C_2H_5$)—$CH_2$—, wherein —$C_2H_4$—O—$CH_3$ is in particular preferred.

In each embodiment of the present invention, the nitrogen-containing $C_1$-$C_{12}$ group is preferably a $C_1$-$C_{12}$ imine group, wherein $R^1$, $R^2$, $R^3$ can be the same or different nitrogen-containing group. The preferable example of the imine group can be represented by a structure of general formula: $(C_nH_{2n+1})(C_mH_{2m+1})C$=N—, wherein m is an integer of 0 to 10; n is an integer of 1 to 11. The preferable examples of the nitrogen-containing imine group include for example $(CH_3)_2C$=N—, $(C_2H_5)_2C$=N— (diethyl ketimine group), $(C_3H_7)_2C$=N— (dipropyl ketimine group), $(C_4H_9)_2C$=N-(di-n-butyl ketimine group or di-tert-butyl ketimine group), $CH_3(CH_2CH_3)C$=N—, $CH_3(C_3H_7)C$=N—, $CH_3(C_4H_9)C$=N— (methyl-n-butyl ketimine group or methyl-tert-butyl ketimine group), $C_2H_5(C_3H_7)C$=N—, $C_2H_5(C_4H_9)C$=N— (ethyl-n-butyl ketimine group or ethyl-tert-butyl ketimine group), $(CH_3)CH$=N—, $(C_2H_5)CH$=N—, $(C_3H_7)CH$=N—, $(C_4H_9)_2C$=N-(di-n-butyl ketimine group or di-tert-butyl ketimine group), wherein —N=$C(CH_2CH_3)CH_3$ is in particular preferred.

In each embodiment of the present invention, $R_4$ is selected from a group consisting of $C_1$-$C_{12}$ of alkyl, alkenyl, aryl, and alkoxy. The examples of $R^4$ include methyl, ethyl, propyl, isopropyl, n-butyl, isobutyl, t-butyl, hexyl, 2-ethylhexyl, vinyl, propenyl butenyl, hexenyl phenyl, tolyl, ethylphenyl, xylyl, propylphenyl, methoxy, ethoxy, propoxy, n-butoxy, isobutoxy, wherein —CH=$CH_2$ (vinyl) is in particular preferred.

During the modification process, the alkoxysilane modifier is connected to the diene chain end of the alkali metal ion-containing conjugated diene rubber. The molar ratio of alkoxysilane modifier to alkali metal ion-containing conjugated diene rubber is ≥0.5, preferably ≥0.6, and more preferably ≥0.7, but should be less than 10.

After modification, solvent is directly removed from the modified conjugated diene rubber, wherein the modified conjugated diene rubber is not contacted with water. The Mooney viscosity (MV) of the modified conjugated diene rubber is in a range of 10 to 150, preferably in a range of 15 to 130.

Modified Conjugated Diene Rubber

After modification, the modified conjugated diene rubber is produced and represented by the following structural formula:

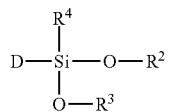

wherein:
D is a polymer of conjugated diene monomer or a copolymer of conjugated diene monomer and vinyl aromatic hydrocarbon monomer; $R^2$, $R^3$ are each independently selected from a group consisting of oxygen-containing $C_2$-$C_{12}$ group and nitrogen-containing $C_1$-$C_{12}$ group; the oxygen-containing $C_2$-$C_{12}$ group has a carbon atom directly connected to oxygen atom of the alkoxysilane; the nitrogen-containing $C_1$-$C_{12}$ group having a nitrogen atom directly connected to oxygen atom of the alkoxysilane: $R^4$ is selected from a group consisting of $C_1$-$C_{12}$ of alkyl, alkenyl, aryl, and alkoxy. In preferred embodiments, the oxygen-containing $C_2$-$C_{12}$ group is an ether group having a structure of general formula: —$C_mH_{2m}$—O—$C_mH_{2n+1}$, wherein each of m and n is a positive integer and m+n=2~12. In particular, the oxygen-containing $C_2$-$C_{12}$ group is preferably —$CH_2CH_2OCH_3$. In preferred embodiments, the nitrogen-containing $C_1$-$C_{12}$ group is an imine group having a structure of general formula: $(C_nH_{2n+1})(C_mH_{2m+1})C$=N—, wherein m is an integer of 0 to 10; n is an integer of 1 to 11. In particular, the nitrogen-containing $C_1$-$C_{12}$ group is preferably —N=$C(CH_2CH_3)CH_3$. The specific examples of D, $R^2$, $R^3$, and $R^4$ can refer to the above descriptions associated with polymerization and modification.

Reaction with Water

In another embodiment of the present invention, the modified conjugated diene rubber is contacted with a large amount of water to improve the stability of Mooney viscosity. The method of contacting the modified conjugated diene rubber with water includes steam stripping and other suitable methods. For steam stripping as an example, the solution of solvent and modified conjugated diene rubber contacts water at a temperature controlled under 150° C., wherein the weight ratio of water to solvent of the solution is at least 0.1, preferably at least 0.5, and more preferably at least 1; the pH value is between 4 and 10. Contact temperature of the two can be 20° C. to 150° C., preferably 30° C. to 140° C., and more preferably 40° C. to 130° C. Contact time of the two can be 5 minutes to 10 hours, preferably 10 minutes to 8 hours, and more preferably 30 minutes to 6 hours. Steam, electric, hot air, or other heat source treatment can be implemented to remove the solvent simultaneously or after the modified conjugated diene rubber contacting water. Other well-known drying treatments such as mechanical dewatering, oven drying, or apron drying can be subsequently performed. Alternatively, the rubber can be dried at 110° C. by hot roll treatment. The coupling ratio of the modified conjugated diene rubber after water contact treatment is 10%~95%, preferably 20%~80%, more preferably 25%~75%, and most preferably 30%~70%.

Mooney viscosity (MV) of the modified conjugated diene rubber after water contact treatment, removal of solvent, and drying process is in a range of 15 to 150, preferably in a range of 25 to 120, and more preferably in a range of 30 to 100.

Composition of Conjugated Diene Rubber

The modified conjugated diene rubber of the present invention may be used in a composition of conjugated diene rubber by mixing another rubber component therewith. Examples of said other rubber component include conventional styrene-butadiene copolymer rubber, polybutadiene rubber, butadiene-isoprene copolymer rubber, and butyl rubber. Specific examples further include natural rubber, ethylene-propylene copolymer rubber, and ethylene-octene copolymer rubber. These components may be used in a mixture of two or more types. In the case where another rubber component is mixed with the modified conjugated diene rubber of the present invention, the amount of modified conjugated diene rubber of the present invention combined is preferably at least 10 parts by weight and more preferably at least 20 parts by weight when the total amount of rubber components combined is 100 parts by weight.

Furthermore, the composition of conjugated diene rubber of the present invention may include an additive. Specific examples of the additive include a vulcanizing agent such as sulfur; a vulcanization accelerator such as a thiazole-based vulcanization accelerator, a thiuram-based vulcanization accelerator, or a sulfenamide-based vulcanization accelerator; a vulcanization activator such as stearic acid or zinc oxide; an organic peroxide; a reinforcing agent such as silica or carbon black; a filler such as calcium carbonate or talc; a silane coupling agent; an extender oil; a processing aid; an antioxidant; and a lubricant.

In the case where silica serving as the reinforcing agent is mixed in the composition of conjugated diene rubber of the present invention, the amount of silica is typically 10 to 200 parts by weight when the total amount of rubber components is 100 parts by weight. From the viewpoint of good fuel economy, the amount of silica is preferably at least 20 parts by weight, and more preferably at least 30 parts by weight. From the viewpoint of reinforcement being enhanced, it is preferably no greater than 180 parts by weight, and more preferably no greater than 150 parts by weight. For example, the silica can be a synthetic amorphous silica such as those obtained by the acidification of a soluble silicate (e.g., sodium silicate or a co-precipitation of a silicate and an aluminate). Such precipitated silicas are, in general, well known to those having skill in such art. The BET surface area of the synthetic silica (precipitated silica), as measured using nitrogen gas, may be in a range of 50 to 300, alternatively 100 to 250, square meters per gram ($m^2/g$), for example. The silica may also have a dibutylphthalate (DBF) absorption value in a range of, for example, 100 to 500 cc/g, and usually 120 to 350 cc/g. Various commercially available synthetic silicas, particularly precipitated silicas, may be considered for use in this invention, for example, but not limited to silicas commercially available from PPG Industries under the Hi-Sil trademark with designations 210, 243, etc., silicas available from Rhodia with designations of Zeosil 1165 MP and Zeosil 165GR, silicas available from EVONIK Industries with designations VN2, VN3, 700GGR and 9000GR, and silicas available from Huber with designations of Zeopol 8745.

When a reinforcing agent other than silica is combined with the composition of conjugated diene rubber of the present invention, from the viewpoint of reinforcement being enhanced, the amount of the reinforcing agent other than silica is preferably no greater than 120 parts by weight, and more preferably no greater than 100 parts by weight when the total amount of rubber components is 100 parts by weight. From the viewpoint of good fuel economy, it is preferably at least 1 part by weight, and more preferably at least 3 parts by weight. As the reinforcing agent other than silica, carbon black is a preferable specific example.

As a method for producing a composition of conjugated diene rubber by mixing another rubber component, an additive, etc. with the modified conjugated diene rubber of the present invention, a known method such as, for example, a method in which each component is kneaded by means of a known mixer such as a roll or a Banbury mixer or an internal mixer can be used. With regard to kneading conditions, when mixing an additive, fillers, silica and/or other reinforcing agent other than a vulcanizing agent or a vulcanization accelerator, the kneading temperature is normally 50° C. to 200° C., and preferably 80° C. to 150° C., and the kneading time is normally 30 seconds to 30 minutes, and preferably 1 minute to 30 minutes. When a vulcanizing agent or a vulcanization accelerator is combined, the kneading temperature is normally no greater than 100° C., and preferably room temperature (e.g. 25° C.) to 90° C. A composition in which a vulcanizing agent or a vulcanization accelerator is combined may be implemented by using a vulcanization treatment such as press vulcanization. The vulcanization temperature is normally 120° C. to 200° C., and preferably 140° C. to 180° C.

The modified conjugated diene rubber and the composition of conjugated diene rubber of the present invention are used for tires, soles, flooring materials, vibration isolating materials, etc., and are particularly suitable for tires, thereby enhancing the tire treads with low rolling resistance and high wet-skid resistance, resulting in better steering stability and reliability.

The polymerization process and modification process of the present invention will be described in detail in reference to the following examples.

Example 1

Oxygen-Containing Group

An autoclave is provided, with an initial capacity of about 5 liters purged with nitrogen gas. The autoclave is then charged with 2750 grams of cyclohexane, 82.5 grams of tetrahydrofuran (THF), 100 grams of styrene, and 390 grams of 1,3-butadiene. Subsequently, 325 milligrams (5.03 mmoles) of n-butyl lithium as catalytically active ingredient for polymerization is added to initiate polymerization at 30° C. The polymerization is carried out in an adiabatic condition. When the polymerization is almost completed, 10 grams of 1,3-butadiene is added and the polymerization is continued for another 5 minutes. Then, 2.82 grams (10.06 mmoles) of vinyl tris(2-methoxyethoxy) silane (also referred as M1) is added and the modification is carried out for 15 minutes. Then, 2,6-di-tert-butyl-p-cresol is added to the polymer solution to end the reaction. After removal of solvent from the solution of polymer rubber, a hot roll drying process is performed at 110° C. to obtain the modified conjugated diene rubber, which is defined as Example 1 rubber. The molar ratio of modifier (alkoxysilane) of Example 1 to conjugated diene rubber-lithium, initial molecular weight (Mi), and various properties of the resulted product are shown in Table 1.

Examples 2 to 5

Oxygen-Containing Group

The polymerization procedures of Examples 2-5 are basically similar to that of Example 1; for the sake of simplicity and concision, the same description therefore is omitted. That is, Examples 2-5 use same solvent and reactants as Example 1, but different amount of reactants. The reaction conditions of each example, such as the molar ratio of modifier (alkoxysilane) to conjugated diene rubber-lithium, initial molecular weight (Mi), and various properties of the resulted product, have been shown in Table 1.

Example 6

Nitrogen-Containing Group

An autoclave is provided, with an initial capacity of about 5 liters purged with nitrogen gas. The autoclave is then charged with 2750 grams of cyclohexane, 82.5 grams of tetrahydrofuran (THF), 100 grams of styrene, and 390 grams of 1,3-butadiene. Subsequently, 325 milligrams (5.03 mmoles) of n-butyl lithium as catalytically active ingredient for polymerization is added to initiate polymerization at 30° C. The polymerization is carried out in an adiabatic condition. When the polymerization is almost completed, 10 grams of 1,3-butadiene is added and the polymerization is continued for another 5 minutes. Then, 5.03 mmoles of vinyl tris(methylethylketoxime)silane (also referred as M2) is added and the modification is carried out for 15 minutes. Then, 2,6-di-tert-butyl-p-cresol is added to the polymer solution to end the reaction. After removal of solvent from the solution of polymer rubber, a hot roll drying process is performed at 110° C. to obtain the modified conjugated diene rubber, which is defined as Example 6 rubber. The molar ratio of modifier (alkoxysilane) of Example 6 to conjugated diene rubber-lithium, initial molecular weight (Mi), and various properties of the resulted product are shown in Table 2.

Example 7 to 9

Nitrogen-Containing Group

The polymerization procedures of Examples 7-9 are basically similar to that of Example 6; for the sake of simplicity and concision, the same description therefore is omitted. That is, Examples 7-9 use same solvent and reactants as Example 6, but different amount of reactants. The reaction conditions of each example, such as the molar ratio of modifier (alkoxysilane) to conjugated diene rubber-lithium, initial molecular weight (Mi), and various properties of the resulted product, have been shown in Table 2.

Comparative Example 1

The polymerization procedure of Comparative Example 1 is basically similar to that of Example 1; for the sake of simplicity and concision, the same description therefore is omitted. For modification, 1.05 grams (5.03 mmoles) of tetraethoxysilane (TEOS) is used in place of alkoxysilane of Example 1 and the modification is carried out for 10 minutes. Then, 2,6-di-tert-butyl-p-cresol is added to the polymer solution to end the reaction. After removal of solvent from the solution of polymer rubber, a hot roll drying process is performed at 110° C. to obtain the modified conjugated diene rubber, which is defined as Comparative Example 1 rubber. The molar ratio of modifier of Comparative Example 1 (alkoxysilane) to conjugated diene rubber-lithium, initial molecular weight (Mi), and various properties of the resulted product haven been shown in Table 1.

Comparative Examples 2 and 3

The polymerization procedures of Comparative Examples 2 and 3 are basically similar to that of Comparative Example 1, except the type of reactants used. For the sake of simplicity and concision, the same description therefore is omitted. In particular, Comparative Example 1 uses tetraethoxysilane (TEOS) as the modifier, while Comparative Example 2 uses tetramethoxysilane (TMOS) as the modifier; Comparative Example 3 uses trimethoxy(methyl)silane (TMOMS) as the modifier. The molar ratio of modifier of each comparative example to conjugated diene rubber-lithium, initial molecular weight (Mi), and various properties of the resulted product have been shown in Table 1.

Hereafter, a method of testing loss tangent of a vulcanized sheet made from the composition of conjugated diene rubber obtained from each example will be described.

100 parts by weight of each example rubber, 78.4 parts by weight of silica (product name: Ultrasil 7000GR, manufactured by EVONIK Industries), 6.9 parts by weight of a silane coupling agent (product name: Si69, manufactured by EVONIK Industries), 50.0 parts by weight of an extender oil (product name: TDAE, manufactured by IRPC Industries), 1.5 parts by weight of an antioxidant (product name: Antigene 3C), 2 parts by weight of stearic acid, 2 parts by weight of zinc oxide, 1.5 parts by weight of a wax, 1.4 parts by weight of sulfur, and 2 parts by weight of a vulcanization accelerator (1 part by weight each of product names CZ and D) are kneaded to give a composition. The composition thus obtained is molded into a sheet using a two roll machine; the sheet is heated at 160° C. for 45 minutes to effect vulcanization, and thus a vulcanized sheet is obtained.

A loss tangent at 60° C. (tan δ (60° C.)) of the vulcanized sheet is measured using a viscoelastometer under conditions of a strain of 1% and a frequency of 10 Hz. Based on the comparative example as standard, let Comparative Example 1 set as 100%, the higher value of the examples, the better effect of fuel economy. A loss tangent at 0° C. (tan δ (0° C.)) of the vulcanized sheet is measured using a viscoelastometer under conditions of a strain of 0.5% and a frequency of 10 Hz. Based on the comparative example as standard, let Comparative Example 1 set as 100%, the higher value of the examples, the better effect of safety on gripping and braking. The loss tangent of the vulcanized sheet of each example is shown in Table 1 and Table 2.

TABLE 1

|  | Example 1 | Example 2 | Example 3 | Example 4 | Example 5 | Comparative Example 1 | Comparative Example 2 | Comparative Example 3 |
|---|---|---|---|---|---|---|---|---|
| Modifier | M1 | M1 | M1 | M1 | M1 | TEOS | TMOS | TMOMS |
| Modifier/Conjugated diene rubber-Lithium (mole ratio) | 2 | 1.5 | 1.1 | 0.8 | 0.5 | 1 | 1 | 0.5 |
| Initial Molecular Weight (Mi, kg/mole) | 256 | 254 | 268 | 236 | 236 | 243 | 237 | 260 |
| Coupling Ratio (polymer solution) % | 49 | 55 | 48 | 58 | 78 | 19 | 41 | 58 |
| MV(after direct de-solvent) | 61 | 65 | 65 | 65 | 79 | 46 | 54 | 71 |
| Coupling Ratio (after steam stripping and drying) % | 70 | 69 | 64 | 58 | 77 | — | — | 61 |
| MV (after steam stripping and drying) | 79 | 77 | 79 | 65 | 81 | — | — | 61 |
| MV (after storage test) | 80 | 77 | 79 | 65 | 82 | 53 | 91 | 61 |
| Styrene Content % | 21 | 21 | 20 | 21 | 21 | 21 | 20 | 21 |
| Vinyl Content % | 63 | 63 | 63 | 63 | 63 | 64 | 63 | 63 |
| Tg ° C. | −24 | −24 | −24 | −23 | −24 | −23 | −24 | −24 |
| Akron Abrasion (Idex) | 135 | 132 | 132 | 130 | 118 | 100 | 105 | 120 |
| tanδ(0° C.) | 158 | 167 | 162 | 151 | 139 | 100 | 103 | 155 |
| tanδ(60° C.) | 114 | 119 | 114 | 109 | 110 | 100 | 104 | 94 |

TABLE 2

| Modifier | Example 6 M2 | Example 7 M2 | Example 8 M2 | Example 9 M2 | Comparative Example 4 TEOS |
|---|---|---|---|---|---|
| Modifier/Conjugated diene rubber-Lithium (mole ratio) | 2.0 | 1.5 | 0.9 | 0.5 | 1.0 |
| Initial Molecular Weight (Mi, kg/mole) | 244 | 257 | 233 | 237 | 243 |
| Coupling Ratio (polymer solution) % | 31 | 29 | 36 | 39 | 19 |
| MV (after direct de-solvent) | 52 | 52 | 51 | 52 | 46 |
| Coupling Ratio (after steam stripping and drying) % | 46 | 39 | 44 | 40 | — |
| MV(after steam stripping and drying) | 63 | 61 | 57 | 54 | — |
| MV (after storage test) | 64 | 60 | 57 | 57 | 53 |
| Styrene Content % | 21 | 20 | 21 | 21 | 21 |
| Vinyl Content % | 64 | 64 | 64 | 63 | 64 |
| Tg° C. | -24 | -24 | -23 | -25 | -23 |
| Akron Abrasion (Idex) | 120 | 117 | 117 | 110 | 100 |
| tanδ (0° C.) | 194 | 206 | 206 | 185 | 100 |
| tanδ (60° C.) | 132 | 123 | 107 | 102 | 100 |

The Akron abrasion represents wear resistance; tan δ (0° C.) represents wet-skid resistance; tan δ (60° C.) represents rolling resistance. The higher value indicates the better performance.

In Table 1 and Table 2, the Mooney viscosity (ML1+4, 100° C.) is measured under the conditions of 1 minute preheating and prolonged 4 minutes at 100° C. The Mooney viscosity can be measured after modification and removal of solvent (referred as direct de-solvent), after steam stripping and mechanical drying (referred as after steam stripping and drying), and after storage test at a temperature of 90° C., relative humidity of 80%, and 40 hours storage (referred as after storage test). In Table 1, the values of MV (after steam stripping and drying) and MV (after storage test) are almost similar, which indicates the stability improvement of Mooney viscosity. The coupling ratio (C/R %) which refers to the ratio of polymers with molecular weight higher than those of uncoupled to the molecular weight of total polymers can be measured with gel permeation chromatography (GPC) equipped with refractive index detector. During measurement, tetrahydrofuran acts as a mobile phase. The coupling ratio can be measured after modification under the polymer solution condition (referred as polymer solution), after steam stripping and mechanical drying (referred as after steam stripping and drying). Microstructure properties (styrene content, 1,2-vinyl content) can be measured by any suitable known techniques, such as Fourier transform infrared spectroscopy (FTIR). The Akron abrasion (Idex) is tested using an Akron abrasion tester under load of 6 pounds, 3300 rpm; higher Idex value indicates better wear resistance.

In Table 1, the Akron abrasion (Idex), tan δ (0° C.), and tan δ (60° C.) of Examples 1-5 are all higher than those in Comparative Examples 1-3, indicating that the performance including wear resistance, wet-skid resistance, and rolling resistance is enhanced.

In Table 2, the Akron abrasion (Idex), tan δ (0° C.), and tan δ (60° C.) of Examples 6-9 are all higher than those in Comparative Example 4, indicating that the performance including wear resistance, wet-skid resistance, and rolling resistance is enhanced.

While the invention has been described by way of examples and in terms of preferred embodiments, it would be apparent to those skilled in the art to make various equivalent replacements, amendments and modifications in view of specification of the invention. Therefore, the scope of the appended claims should be accorded the broadest interpretation so as to encompass all such replacements, amendments and modifications without departing from the spirit and scope of the invention.

The invention claimed is:

1. A method for producing a modified conjugated diene rubber, comprising:
   (a) providing an alkali metal ion-containing conjugated diene rubber; and
   (b) reacting the alkali metal ion-containing conjugated diene rubber with an alkoxysilane to generate the modified conjugated diene rubber, the alkoxysilane being of the structural formula:

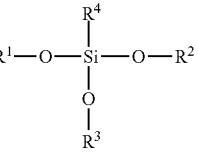

wherein $R^1$, $R^2$, $R^3$ are each independently selected from a group consisting of oxygen-containing $C_2$-$C_{12}$ group and nitrogen-containing $C_1$-$C_{12}$ group, the oxygen-containing $C_2$-$C_{12}$ group having a carbon atom directly connected to oxygen atom of the alkoxysilane, the nitrogen-containing $C_1$-$C_{12}$ group having a nitrogen atom directly connected to oxygen atom of the alkoxysilane; and
$R^4$ is selected from a group consisting of $C_1$-$C_{12}$ of alkyl, alkenyl, aryl, and alkoxy.

2. The method as claimed in claim 1, wherein the conjugated diene rubber is a polymer of conjugated diene monomer or a copolymer of conjugated diene monomer and vinyl aromatic hydrocarbon monomer.

3. The method as claimed in claim 1, wherein the oxygen-containing $C_2$-$C_{12}$ group is an ether group having a structure of general formula: $-C_mH_{2m}-O-C_nH_{2n+1}$, wherein each of m and n is a positive integer and m+n=2~12.

4. The method as claimed in claim 3, wherein the oxygen-containing $C_2$-$C_{12}$ group is $-CH_2CH_2OCH_3$.

5. The method as claimed in claim 1, wherein the nitrogen-containing $C_1$-$C_{12}$ group is an imine group having a structure of general formula: $(C_nH_{2n+1})(C_mH_{2m+1})C=N-$, wherein m is an integer of 0 to 10; n is an integer of 1 to 11.

6. The method as claimed in claim 5, wherein the nitrogen-containing $C_1$-$C_{12}$ group is $-N=C(CH_2CH_3)CH_3$.

7. The method as claimed in claim 1, wherein $R^4$ is $-CH=CH_2$.

8. The method as claimed in claim 1, wherein the molar ratio of the alkoxysilane to the alkali metal ion-containing conjugated diene rubber is ≥0.5.

9. The method as claimed in claim 1, further comprising a step (c):
   contacting the product of the step (b) with water.

10. The method as claimed in claim 9, wherein the treatment of the step (c) includes steam stripping.

11. The method as claimed in claim 1, wherein the initial number-average molecular weight of the alkali metal ion-containing conjugated diene rubber before reacting with the alkoxysilane is in a range of 80 kg/mole to 2000 kg/mole.

12. The method as claimed in claim 10, wherein the coupling ratio of the modified conjugated diene rubber after the step (c) is 10%~95%.

13. A modified conjugated diene rubber produced by the method as claimed in claim 1.

14. A composition of conjugated diene rubber, comprising:
the modified conjugated diene rubber as claimed in claim 13; and
a silica.

15. The composition as claimed in claim 14, wherein when the total amount of rubber components of the composition is 100 parts by weight, the modified conjugated diene rubber is at least 10 parts by weight.

16. The composition as claimed in claim 14, wherein when the total amount of rubber components of the composition is 100 parts by weight, the silica is 10 to 200 parts by weight.

17. A modified conjugated diene rubber, the modified conjugated diene rubber represented by the following structural formula:

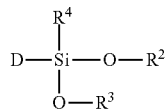

wherein:
D is conjugated diene rubber; $R^2$, $R^3$ are each independently selected from a group consisting of oxygen-containing $C_2$-$C_{12}$ group and nitrogen-containing $C_1$-$C_{12}$ group, the oxygen-containing $C_2$-$C_{12}$ group having a carbon atom directly connected to oxygen atom of the alkoxysilane, the nitrogen-containing $C_1$-$C_{12}$ group having a nitrogen atom directly connected to oxygen atom of the alkoxysilane; and $R^4$ is selected from a group consisting of $C_1$-$C_{12}$ of alkyl, alkenyl, aryl, and alkoxy.

18. The modified conjugated diene rubber as claimed in claim 17, wherein the conjugated diene rubber D is a polymer of conjugated diene monomer or a copolymer of conjugated diene monomer and vinyl aromatic hydrocarbon monomer.

19. The modified conjugated diene rubber as claimed in claim 17, wherein the oxygen-containing $C_2$-$C_{12}$ group is an ether group having a structure of general formula:
—$C_mH_{2m}$—O—$C_nH_{2n+1}$, wherein each of m and n is a positive integer; and m+n=2~12.

20. The modified conjugated diene rubber as claimed in claim 19, wherein the oxygen-containing $C_2$-$C_{12}$ group is —$CH_2CH_2OCH_3$.

21. The modified conjugated diene rubber as claimed in claim 17, wherein the nitrogen-containing $C_1$-$C_{12}$ group is an imine group having a structure of general formula: $(C_nH_{2n+1})(C_mH_{2m+1})C{=}N$—, wherein m is an integer of 0 to 10; n is an integer of 1 to 11.

22. The modified conjugated diene rubber as claimed in claim 21, wherein the nitrogen-containing $C_1$-$C_{12}$ group is —$N{=}C(CH_2CH_3)CH_3$.

23. The modified conjugated diene rubber as claimed in claim 17, wherein $R^4$ is —$CH{=}CH_2$.

24. The modified conjugated diene rubber as claimed in claim 17, wherein the coupling ratio of the modified conjugated diene rubber is 10%~95%.

25. The modified conjugated diene rubber as claimed in claim 17, wherein the modified conjugated diene rubber has been treated by contacting water.

26. A composition of conjugated diene rubber, comprising:
the modified conjugated diene rubber as claimed in claim 17; and
a silica.

27. The composition as claimed in claim 26, wherein when the total amount of rubber components of the composition is 100 parts by weight, the modified conjugated diene rubber is at least 10 parts by weight.

28. The composition as claimed in claim 26, wherein when the total amount of rubber components of the composition is 100 parts by weight, the amount of the silica is 10-200 parts by weight.

* * * * *